United States Patent
Dove

(10) Patent No.: US 7,116,678 B2
(45) Date of Patent: Oct. 3, 2006

(54) HIGH SPEED PHYSICAL LAYER FOR CSMA/CD SYSTEMS

(75) Inventor: Daniel Dove, Applegate, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 278 days.

(21) Appl. No.: 10/837,264

(22) Filed: Apr. 30, 2004

(65) Prior Publication Data
US 2004/0218621 A1 Nov. 4, 2004

(51) Int. Cl.
H04L 12/413 (2006.01)
(52) U.S. Cl. ................... 370/447; 375/292
(58) Field of Classification Search ............ None
See application file for complete search history.

(56) References Cited

U.S. PATENT DOCUMENTS 5,216,714 A * 6/1993 Speiser ................ 380/268
5,280,500 A * 1/1994 Mazzola et al. ............ 375/286
5,439,571 A * 8/1995 Sammons et al. .......... 204/549
5,784,409 A * 7/1998 Coles .................... 375/286
5,784,573 A * 7/1998 Szczepanek et al. ....... 709/250
6,052,390 A * 4/2000 Deliot et al. .............. 370/528
6,147,963 A * 11/2000 Walker et al. ............. 370/200
6,215,816 B1 * 4/2001 Gillespie et al. ........... 375/219

FOREIGN PATENT DOCUMENTS

WO      WO 95/02283      * 1/1995

* cited by examiner

Primary Examiner—Doris H. To
Assistant Examiner—Phuongchau Ba Nguyen

(57) ABSTRACT

An electronic communications network technology, referred to as 100BASE-TD, offers full duplex operation and robust performance on marginal CAT5 wiring. It highly leverages 100BASE-TX functional blocks and is very complementary to 100BASE-TX, for example with regard to such 100BASE-TX features as auto-negotiation. In particular, the invention provides a carrierless IDLE that requires very low power during ambient operation.

9 Claims, 5 Drawing Sheets

This transition only occurs if the RDS exceeds a pre-defined limit. 4B5B coding prevents this occurance during normal data transmission.

HIGH SPEED PHYSICAL LAYER FOR CSMA/CD SYSTEMS

BACKGROUND OF THE INVENTION

1. Technical Field

The invention relates to electronic communications networks. More particularly, the invention relates to a high speed physical layer for CSMA/CD systems.

2. Description of the Prior Art

In recent years, a number of technologies have been developed to solve customer needs for higher bandwidth networking. Of these technologies, several approaches have been developed in the IEEE's 802.3u committee to meet various customer wiring installations. While these technologies have their particular capabilities, each has its own specific shortcomings as well.

For example, 100BASE-TX technology offers full duplex operation at 125 MHz, yet it only requires two pair of cables when it is used on category 5 UTP or shielded twisted pair (STP). Further, 100BASE-TX is widely supported by industry. Unfortunately, this technology provides only marginal signal quality on poor to moderate CAT5 data grade unshielded twisted pair cable (UTP). See the ISO/IEC1801 Wiring Specification. 100BASE-TX is very difficult to Implement because of Its high bandwidth requirements. Thus, although this technology may be implemented with two pair of cables, in fact it requires all four pair of an unshielded twisted pair cable to ease noise sensitivities. Further, interoperability is difficult to achieve because of the small signal margin available, e.g. 1 volt peak amplitude during transmit. Because this technology is implemented using a continuous carrier technique that requires carrier coding, it is sensitive to noise, e.g. a single bit error can lead to the false detection of carrier sense. Finally, it should be noted that continuous carrier requires high power during ambient operation. This makes 100BASE-TX technology unattractive for low power or portable applications, such as for use with laptop computers.

100BASE-T4 technology supports CAT 3, 4, and 5 UTP cable. However, this technology only operates at half duplex, which limits its application for switched environments. At this time, there is no significant industry support for this technology because, for example, the complex waveshaping required to implement this technology has made interoperability difficult to achieve. Finally, performance of this technology is only marginal on CAT3 wire.

100BASE-T2 supports CAT 3, 4, and 5 UTP cables. Further, this technology provides full duplex operation. However, complex signalling requirements of this technology mandates the use of a digital signal processor (DSP). At this time, there is no known industry support for this technology. Finally, it should be noted that this technology is implemented with a continuous carrier that requires high power during ambient operation. This makes 100BASE-T2 technology unattractive for low power or portable applications, such as for use with laptop computers.

As can be seen from the above discussion, each of the existing technologies has substantial limitations. None of the 100BASE-TX alternatives share any common coding logic with 100BASE-TX and, therefore, there is no benefit to creating a multi-technology PHY using 100BASE-TX as the common base technology.

It would be advantageous to provide an electronic communications network technology that offered full duplex operation and robust performance on marginal CAT5 wiring, while taking advantage of industry standard 100BASE-TX functionality. It would be particularly advantageous if such technology were complementary to 100BASE-TX, as well as compatible with such 100BASE-T features as auto-negotiation.

SUMMARY OF THE INVENTION

The invention provides an electronic communications network technology, which is referred to herein as 100BASE-TD. This technology offers full duplex operation and robust performance on marginal CAT5 wiring. It highly leverages 100BASE-TX functional blocks and is very complementary to 100BASE-TX, for example with regard to such 100BASE-TX features as auto-negotiation, 4B to 5B coding, and scrambling. A key feature of the invention provides a carrierless IDLE that requires very low power during ambient operation.

By transmitting and receiving on two separate pairs of cables, the invention allows a reduction in the bandwidth per cable pair. This both reduces attenuation and allows an increase in the minimum transmit amplitude. In this way, a carrier need not be sent during idle, but only during actual transmit. The reduced bandwidth and higher transmit voltage allows transmit carrier detection using standard amplitude detection techniques, such as those found in 10BASE-T and 100BASE-T4.

Thus, the preferred embodiment of the invention provides a protocol having a slower baud rate than that of 100BASE-TX, e.g. 62.5 MHz as opposed to 125 MHz for 100BASE-TX. Additionally, the invention operates with a higher transmission voltage than that of 100BASE-TX, e.g. 2.5 volts peak amplitude during transmit as opposed to 1 volt peak amplitude during transmit for 100BASE-TX.

DETAILED DESCRIPTION OF THE INVENTION

100BASE-TX (also known as Fast Ethernet), which is presently the industry standard, is sensitive to cable imperfections and has many interoperability problems. Its continuous transmission technique requires as much as 200 mA during quiescent states, which makes it difficult to meet power savings objectives for Green Frame applications, i.e. low power or energy conserving applications.

The invention provides an electronic communications network technology, which is referred to herein as 100BASE-TD. This technology offers full duplex operation and robust performance on marginal CAT5 wiring. It highly leverages 100BASE-TX functional blocks and is very complementary to 100BASE-TX, for example with regard to such 100BASE-TX features as auto-negotiation, 4B5B coding and scrambling. Further, the invention provides a carrierless IDLE that requires very low power during ambient operation.

By transmitting and receiving on two separate pairs of cables, the invention allows a reduction in the bandwidth per cable pair. This both reduces attenuation and allows an increase in the minimum transmit amplitude. In this way, a carrier need not be sent during idle, but only during actual transmit. The reduced bandwidth and higher transmit voltage allows transmit carrier detection using standard amplitude detection techniques, such as those found in 10BASE-T and 10BASE-TX.

Thus, the preferred embodiment of the invention provides a protocol having a slower baud rate than that of 100BASE-TX, e.g. 62.5 MHz as opposed to 125 MHz for 100BASE-TX. Additionally, the invention operates with a higher transmission voltage than that of 100BASE-TX, e.g. 2.5 volts peak amplitude during transmit as opposed to 1 volt peak amplitude during transmit for 100BASE-TX.

Figure 1:
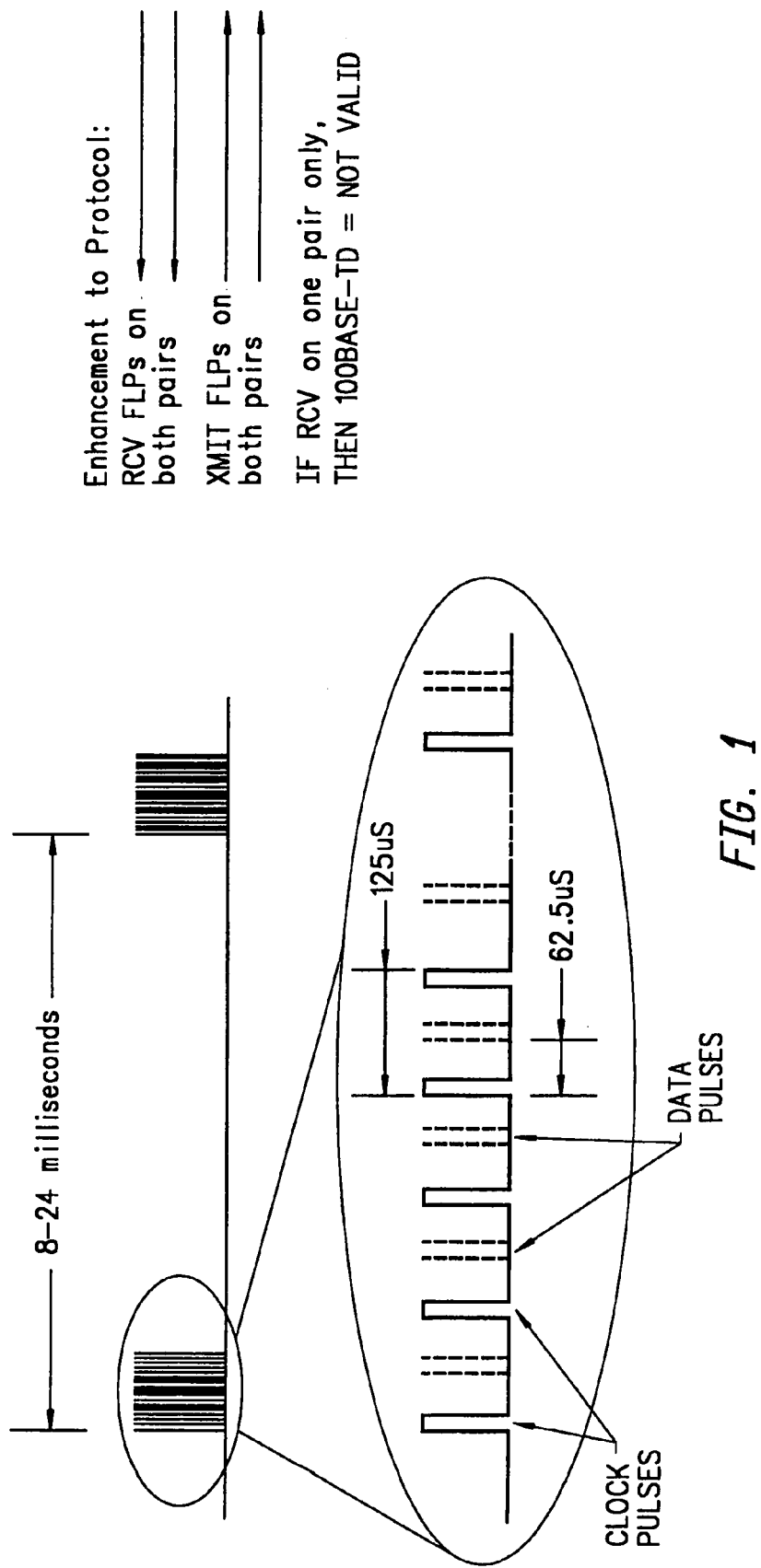
FIG. 1 is a timing diagram showing auto-negotiation according to the invention.

100BASE-TD complements 100BASE-TX, by providing a robust physical layer to be used when all four pairs of a CAT5 UTP cable are available. With the availability of auto-negotiation, it relatively straightforward for a pair of devices to indicate that they support 100BASE-TD. By sending link pulses on both transmit pairs, it is possible to verify that the wire supports the 100BASE-TD technology as well. Auto negotiation uses a repetitive sequence of pulses on the cable to indicate capability of each link partner. In 100BASE-T, there are 16 clock pulses and up to 16 data pulses used to convey information between nodes on the link. While this normally occurs only on one transmit pair and one receive pair, it may also be incorporated into multiple pairs to ensure that the wiring supports multi-pair technology, e.g. 100BSE-TD (see FIG. 1). The DATA pulses contain information such as technology ability, speed, duplex mode, and allow the two ends of the link to find the highest common denominator. 100BASE-TD is thought to be a superior 100 Mbps technology because it offers higher reliability and full-duplex operation at a lower average power.

Figure 2:
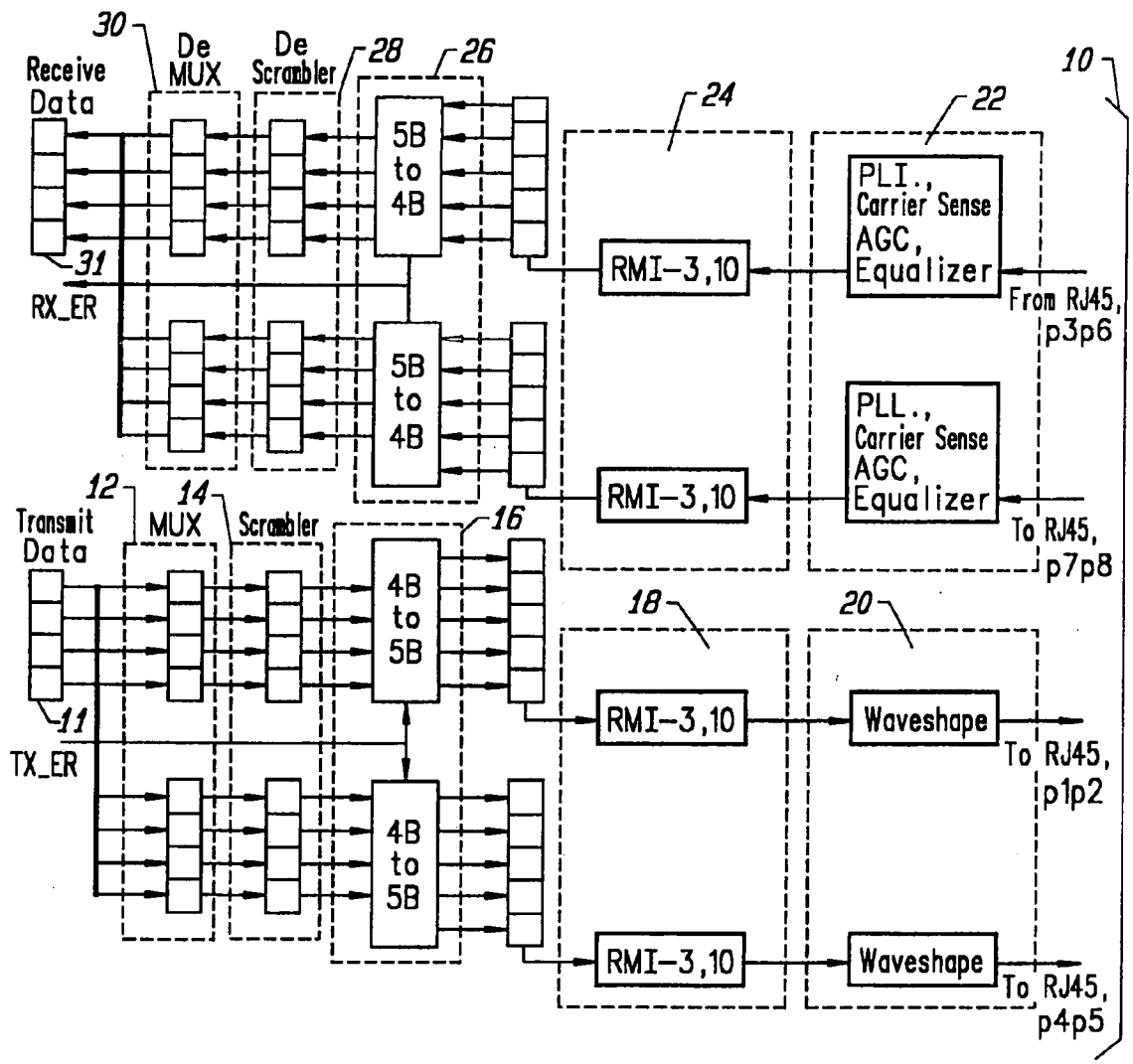
FIG. 2 is a block schematic diagram of a high speed physical layer for CSMA/CD systems according to the invention.

FIG. 2 is a block schematic diagram of a high speed physical layer for CSMA/CD systems according to the invention. The preferred embodiment of the invention requires four pair of CAT5 UTP cable. As can be seen on FIG. 2, four pairs of cables 10 are required to provide a network connection using the 100BASE-TD protocol disclosed herein. The preferred embodiment of the invention includes at least one transmit port 11 that couples a user system to a network to allow transmission of data thereto, and at least one receive port 31 that couples the user system to the network to allow reception of data thereby.

MII Interface

100BASE-TD uses the exact same MII interface as defined by the IEEE 802.3u specification. See Table A below.

TABLE A

MEDIA INDEPENDENT INTERFACE
*Allow for various physical layers to be connected to the MAC

| Signal Name | Source | Clock | Description |
|---|---|---|---|
| RXD[3.0] | PHY | RX_CLK | Nibble wide data stream coming from PHY |
| RX_DV | PHY | RX_CLK | Indicates that receive data is valid. This signal is asserted prior to SFD and deasserted prior to EFD |

TABLE A-continued

MEDIA INDEPENDENT INTERFACE
*Allow for various physical layers to be connected to the MAC

| Signal Name | Source | Clock | Description |
|---|---|---|---|
| RX_ER | PHY | RX_CLK | Indicates a receive error has occurred. This might be due to MLT-3 code violations or 5B4B decode errors |
| CRS | PHY | N/A | This signal is asserted whenever transmit or receive is in progress. In receive mode, it occurs when non-idle symbols are decoded. |
| COL | PHY | N/A | This signal is asserted whenever a collision is detected. In 10 Mbps mode, this signal will operate like SQE after a packet has been transmitted. |
| RX_CLK | PHY | | The receive data clock which is continuous. If no data is present, this clock will be synchronized to the transmit clock and when data is detected, will switch over by holding a pulse high or low for an extended time. This can only occur when RX_DV is false. This signal is nominally ¼ the data rate. |
| TXD[3.0] | STA | TX_CLK | Nibble wide data stream coming from the STA. |
| TX_EN | STA | TX_CLK | Indicates that transmit data is valid on the rising edge of TX_CLK. |
| TX_ER | STA | TX_CLK | Indicates a transmit error has occurred. This signal tells the PHY to begin transmitting HALT symbols to indicate an error exists, m rather than the actual data being transferred. |
| TX_CLK | PHY | N/A | The transmit data clock is generated by the PHY as a source for the STA to generate data/control signals. This clock is nominally ¼ the data rate. |
| MDIO | STA/PHY | MDC | Bidirectional signal to transmit control/address/data between the STA and PHY. Valid on rising edge of MDC. |
| MDC | STA | N/A | Clock signal for MDIO information. |

MUX Circuit

The preferred embodiment of the invention includes a multiplexer MUX 12. Transmit data received at a transmit data port 11 are multiplexed by the MUX 12 in nibble wide groups to allow transmission on two pairs. The first nibble goes onto the 1,2 pair p1p2 and the second nibble goes onto the 4,5 pair p4p5. This adds a 4BT clock cycle (40 nS each) latency to the system.

Scrambler Circuit

To reduce emissions and Near End Crosstalk (NEXT), and to improve transition distribution, a scrambler 14 is used. A Stream Cypher (which is a type of data scrambler) is used because of its simplicity and the fact that it does not propagate errors. The Stream Cypher seeds for pair 1 and pair 2 are different to provide relative dispersion in NEXT content. Because 100BASE-TD is carrierless when the network is idle, the Stream Cypher may be synchronized at the receiver with the occurrence of Start of Frame Delimiter (SFD), i.e. an indication in the 802.3 frame that a packet is beginning. Because the subsequent RMI coder (discuss below) does not create a baseline wander phenomena, the scrambler may be aligned in this way.

4B to 5B Coder

100BASE-TD uses the exact same 4B to 5B coding circuit 16 as defined by the IEEE 802.3u specification. This allows leverage of the circuit in a 10/100TX/100TD transceiver. The currently defined J,K and T,R code group may be used to indicate start_delimiter and end_delimiters respectively.

RMI Encoder

Figure 3:
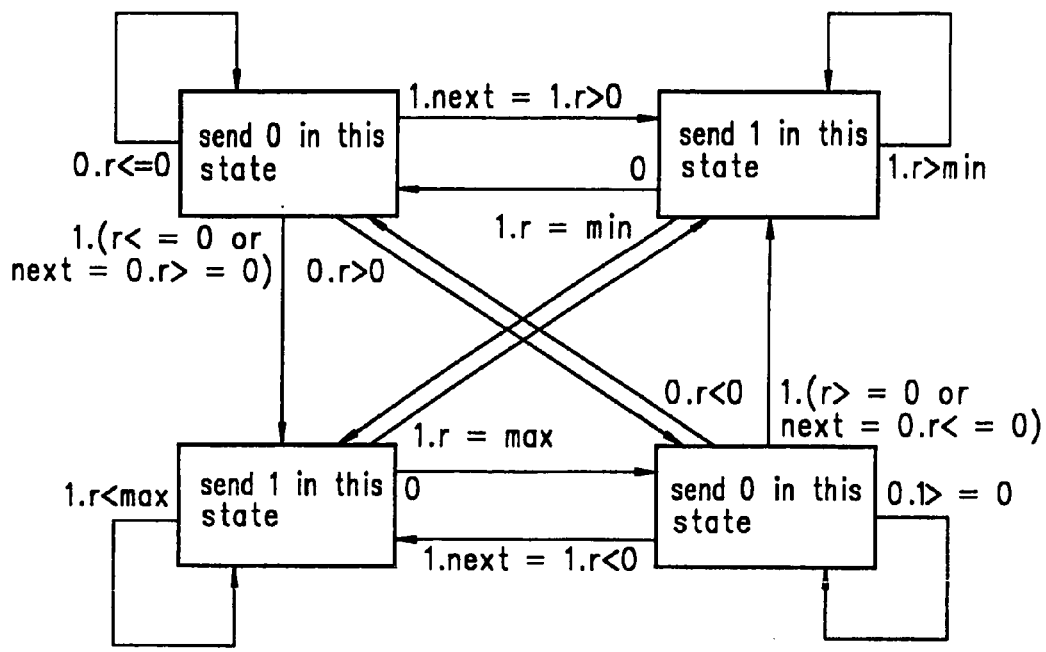
FIG. 3 is a state diagram for an RMI encoder/decoder according to the invention.

The preferred embodiment of the invention includes a regulated mark Inversion (RMI) encoder 18 (see FIG. 3). RMI is an encoding technique that tracks the Running Digital Sum (RDS) of the transmitted data and ensures that a DC balance is maintained. This code generates a +1 or a −1 if the binary data presented to it is a one. It generates a 0 if the data presented to it Is a zero. It alternates between +1s and −1s at each transition to 0. If the RDS exceeds a limit (e.g. 10 baud) It jumps from the +1 to the −1, or vice-versa. Running digital sum is the cumulative value of all bits transmitted for every bit. For example:

$$
\begin{array}{r}
+1 \\
+1 \\
+1 \\
0 \\
-1 \\
-1 \\
0 \\
+1 \\
0 \\
-1 \\
\underline{-1} \\
RDS = \quad 0
\end{array}
$$

Figure 4:
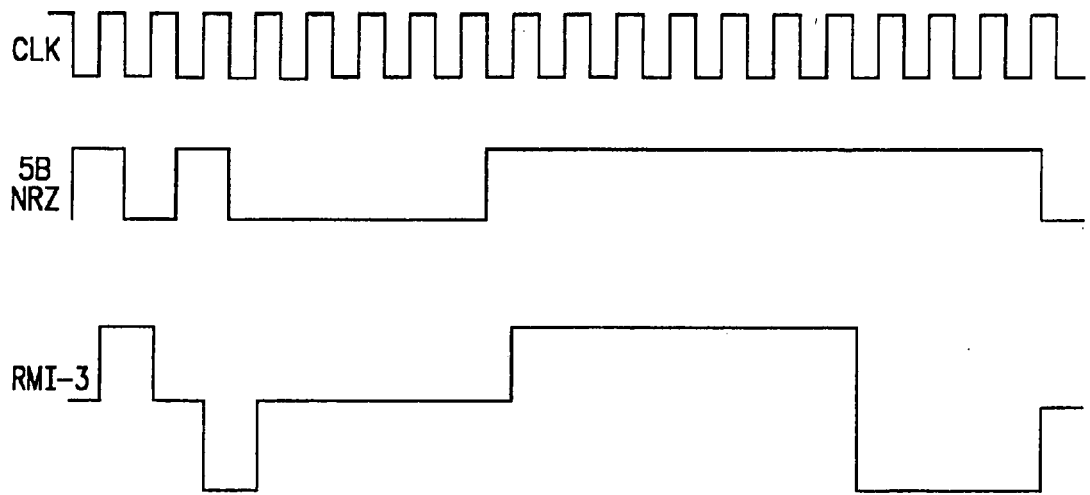
FIG. 4 is a timing diagram showing RMI coding according to the invention.

FIG. 4 is a timing diagram showing RMI coding according to the invention. When combined with the 4B to 5B coding, the data transition normally from +1 to 0, 0 to −1, 0 to +1, and −1 to 0. The use of RMI coding maintains the DC content of the transmitted signal at 0 and thus prevents baseline wander. This simplifies receiver design for a system that incorporate the 100BASE-TD protocol.

Waveshaping

The preferred embodiment of the invention includes a waveshaping circuit 20. RMI is transmitted at 62.5 Megabaud. The only requirement for waveshaping is to keep the harmonic components down below that of an MLT-125 spectral mask, i.e. the power spectral density curve (energy vs. frequency). This can be done with a relatively simple transmit waveshaper, as is well known in the art.

The receive portion of the system is also shown in FIG. 2. The receive carrier sense circuit, receive phase lock loop (PLL) circuit, receive adaptive equalization circuit, and automatic gain control circuit is each discussed below and are indicated collectively in FIG. 2 by the numeric designation 22.

Receive Carrier Sense Circuit

Because 100BASE-TD uses a carrierless IDLE, a conventional squelch may be used. The amplitude of the minimum signal level received is greater than 600 mV. To provide robust performance, a squelch level of 350 mV is used in the presently preferred embodiment of the invention.

Receive Phase Lock Loop (PLL) Circuit

Figure 5:
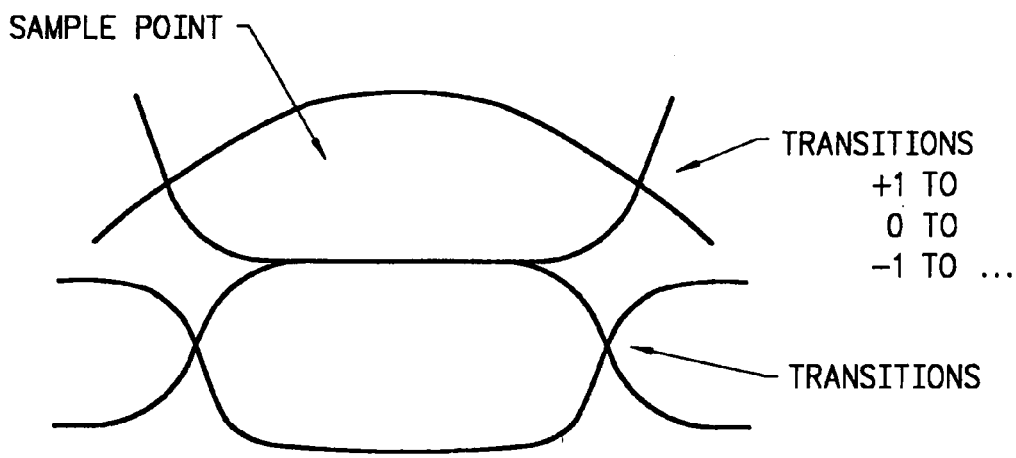
FIG. 5 is an Eye diagram showing bits overlapped in time according to the invention.

Because 100BASE-TD uses a carrierless IDLE, a slightly different PLL design must be used as compared to that used by 100BASE-TX. In the presently preferred embodiment of the Invention, the PLL must be able to acquire phase lock within 46 baud times after carrier has become present. With digital PLLs, this Is not a substantial problem. A single PLL may be used for both receive channels, where separate phase detectors are used to center the sampler on the received eye. Whole bits overlapped in time create an eye diagram (see FIG. 5). Because of cable propagation delay differences, skew between pairs may be as much as 50 ns. Therefore, a good design should account for up to 100 ns skew. The start_delimiters may be used on the receiver to align data being received. Skew compensation may take up to another 8 BT of delay.

Receive Adaptive Equalization Circuit

Adaptive equalization is a technique that is used in receivers to compensate for the signal losses that are encountered in a transmission medium. For category 5 UTP cabling, the primary sources of signal loss are the following:

Frequency Dependent Attenuation;
Group Delay; and
Structural Return Loss.

Figure 6:
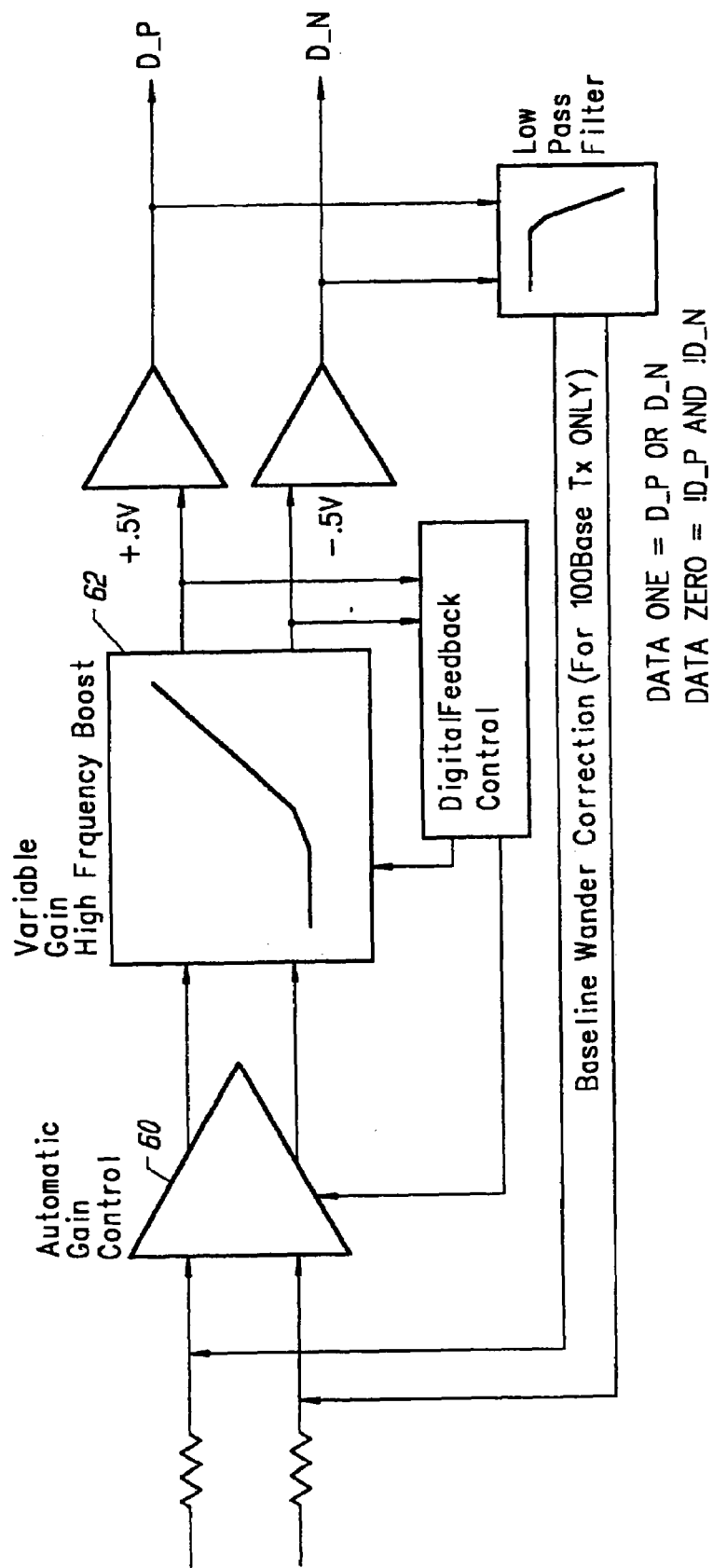
FIG. 6 is a block schematic diagram showing an adaptive equalization circuit according to the invention.

Adaptive Equalizer Control may be performed digitally by evaluating the amplitude of small and large pulses then modifying the AGC 60 and VGHFB 62 control signals to equalize the relative amplitudes (see FIG. 6.) The AGC is used to set up an absolute maximum level (typically based upon large pulse amplitudes as they are minimally affected by UTP cable attenuation) and then the VGHFB circuit parameters may be modified until the long and short pulse amplitudes are matched. The key benefit of a digital implementation is that it may be operated at a very low bandwidth by increasing the number of bits used to count the period between updates.

Because 100BASE-TD uses a carrierless IDLE, the equalizer adaptation algorithm is best implemented with a digital control circuit By doing so, equalizer settings may be maintained during periods of time when no energy is present. It is possible to use one channel to perform adaptation or to use both receive channels in a way that arrives at a best fit adaptation that compensates for the average channel loss of the two pairs.

Receive RMI Decoder Circuit

The receive RMI decoder circuit 24 (FIG. 2) receives and decodes the incoming RMI signal. It has the ability to detect coding errors, which may be useful for improving Undetected Bit Error Rates (UBER) beyond that provided by the 5B to 4B Decoder.

Receive 5B to 4B Decoder Circuit

The receive 5B to 4B decoder circuit 26 (FIG. 2) receives and decodes the incoming data stream. It looks for the occurrence of preamble, and then aligns its 5B decoder on the Start-Delimiter. In some embodiments of the invention a filler byte of preamble may be required to ensure proper alignment of 5B symbols with 4B data nibbles at the MII.

Receive Descrambler Circuit

The receive descrambler circuit 28 (FIG. 2) receives the scrambled 4B data and deciphers it according to the position of the cypher by using its initialization seed. The descrambler circuit determines that the preamble and start of Frame Delimiter (SFD) have arrived, which places it into its initialization state.

Receive DeMUX Circuit

Figure 7:
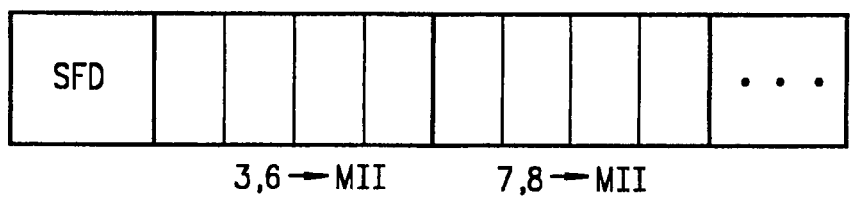
FIG. 7 is a flow diagram showing an algorithm employed by the receive deMUX circuit according to the invention.

The receive deMUX circuit 30 (FIG. 2) receives the incoming 4B data and demultiplexes it from the two receive channels for delivery to receiver port 31. It follows a simple algorithm which starts with the 3,6 pair then switches to the 7,8 pair, and then repeats (see FIG. 7.)

With regard to the presently preferred embodiment of the invention, the following considerations apply:

Transmit Waveshaping must be simple, yet must keep energy levels above 60 MHz down below a reasonable level. Waveshaping must be performed to allow common magnetics, e.g. isolation transformers, for 10/100TX/100TD.

Equalizer Digital Feedback mechanism must hold during silence. This type of circuit has been implemented on 100T4 and 100VG applications. It should be carefully designed to adapt during a few packets worth of time.

Figure 8:
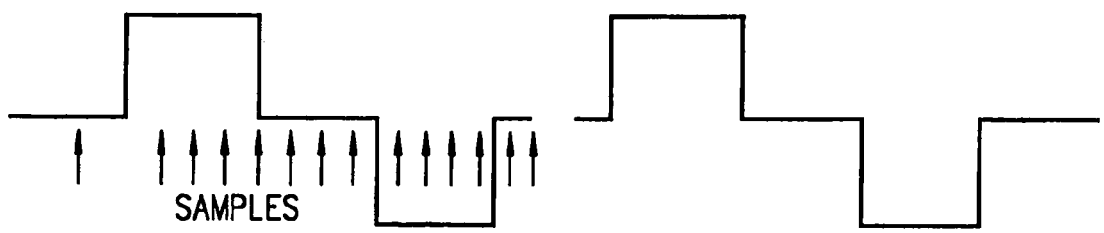
FIG. 8 is a timing diagram showing a digital oversampling technique according to the invention.

Zero Phase PLL acquisition is designed to implement proper lock on the data cells prior to the detection of Start Delimiter. If bit errors are to occur during the preamble they must not be passed to the MII. A criteria for losing bits on the beginning of carrier must be defined. A digital oversampling technique is preferred (see FIG. 8) because oversampling allows rapid digital acquisition of transition positions.

RMI Disparity Level is defined such that it ensures DC balance without ever making a +1−1 or −1+1 transition during normal operation.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An electronic communications network device, comprising:
   a receive port terminating a receive path and said receive port providing connections to at least two pairs of receive cables;
   a transmit port terminating a transmit path and said transmit port providing connections to at least two pairs of transmit cables;
   a scrambler circuit coupled to said transmit port;
   a 4B to 5B coder coupled to said scrambler circuit;
   a regulated mark inversion (RMI) coder coupled to said 4B to 5B coder;
   wherein data transmissions over a communications network are split by data network transmitters amongst two pair of a set of four pair of cables, wherein said data transmission split reduces bandwidth load and signal attenuation per cable pair and enables an increase in minimum transmit amplitude, wherein a carrier is sent during actual transmit and not sent during idle, and further wherein a transmitted signal is passed in sequence through said scrambler circuit, said 4B to 5B coder, and said RMI coder.

2. The device of claim 1, further comprising:
   a de-scrambler circuit coupled to said receive port;
   a 5B to 4B coder coupled to said de-scrambler circuit;
   a regulated mark inversion (RMI) decoder coupled to said 5B to 4B decoder;
and wherein, a received signal is passed in sequence through said RMI decoder, said 5B to 4B decoder, and said de-scrambler circuit.

3. The device of claim 1, further comprising:
   an auto-negotiator, connected to said communication network, operable to indicate that a particular pair of the data-network transmitters and receivers can support a 100 BASE-TD operation.

4. The device of claim 1, further comprising:
   an IEEE 802.3u media independent interface (MII) providing for an interconnection of a physical layer to a media access controller (MAC) in any of the data-network transmitters and receivers.

5. The device of claim 1, further comprising:
   a multiplexer (MUX) operable to provide nibble-wide multiplexing in the data-network transmitters of data for transmission on said computer network over said two transmit pairs of wires; and
   a demultiplexer (deMUX) operable to demultiplex an incoming 4B-data from two corresponding two receive pairs of wires and that switches from a 3,6 pair and a 7,8 pair.

6. A full-duplex data network communications system for Category-5 unshielded twisted pair cabling, comprising:
   at least one data-network transmitter providing for full-duplex operation;
   at least one data network receiver providing for full-duplex operation;
   a set of four pairs of wire in a Category-5 unshielded twisted pair (UTP) cable operable to interconnect the data-network transmitters and receivers, and which include a transmit pair and a receive pair of wires;
   a scrambler circuit coupled to one of said at least one transmitter;
   a 4B to 5B coder coupled to said scrambler circuit;
   a regulated mark inversion (RMI) coder coupled to said 4B to 5B coder;
wherein a data transmission is passed in sequence through said scrambler circuit, said 4B to 5B coder, and said RMI coder; and wherein said data transmission is split by the data-network transmitters amongst two pair of the set of four pairs of wire, wherein said data transmission split reduces bandwidth load and signal attentuation per cable pair and enables an increase in minimum transmit amplitude, wherein a carrier is sent during actual transmit and not sent during transmit.

7. The system of claim 6, further comprising:
   a regulated mark inversion (RMI) decoder coupled to one of said at least one receiver;
   a 5B to 4B decoder coupled to said RMI;
   a de-scrambler circuit coupled to said 5B to 4B decoder; and
   wherein a received signal is passed in sequence through said RMI decoder, said 5B to 4B decoder, and said de-scrambler circuit.

8. The system of claim 7, further comprising:
   a phase-lock loop (PLL) circuit included in the data-network receivers operable to acquire phase lock within forty-six cycles of a frequency carrier burst beginning on two receive pairs of wires that exhibit as much as 100 nanoseconds of signal skew between said pairs of wires.

9. A full duplex data exchange method for an electronic communications network, comprising:
   scrambling a signal;
   processing said signal with a 4B to 5B coder, after said scrambling;
   processing said signal with a regulated mark inversion (RMI) coder, after said processing with said 4B to 5B coder;
   transmitting said signal over a transmit port having connection to two pairs of transmit cables;
   receiving said transmitted signal on a receive port having connections to two pairs of receive cables;
   processing said received signal with a regulated mark inversion (RMI) decoder, wherein said RMI coder is coupled to said 4B to 5B coder, wherein data transmissions over a communications network are split by data network transmitters amongst two pair of a set of four pair of cables, wherein said data transmission split reduces bandwidth load and signal attenuation per cable pair and enables an increase in minimum transmit amplitude, wherein a carrier is sent during actual transmit and not sent during idle, and further wherein a transmitted signal is passed in sequence through said scrambler circuit, said 4B to 5B coder, and said RMI coder;

processing said signal with a 5B to 4B decoder, after said processing with said RMI decoder; and descrambling said signal after said processing with said 5B to 4B decoder.

* * * * *

UNITED STATES PATENT AND TRADEMARK OFFICE
CERTIFICATE OF CORRECTION

| | | |
|---|---|---|
| PATENT NO. | : 7,116,678 B2 | Page 1 of 1 |
| APPLICATION NO. | : 10/837264 | |
| DATED | : October 3, 2006 | |
| INVENTOR(S) | : Daniel Dove | |

It is certified that error appears in the above-identified patent and that said Letters Patent is hereby corrected as shown below:

In column 7, line 51, in Claim 2, delete "dc-scrambler" and insert -- de-scrambler --, therefor.

In column 8, line 30, in Claim 6, delete "attentuation" and insert -- attenuation --, therefor.

In column 8, line 33, in Claim 6, delete "transmit." and insert -- idle. --, therefor.

In column 8, line 44, in Claim 8, delete "phase-Iock" and insert -- phase-lock --, therefor.

Signed and Sealed this

Twenty-third Day of February, 2010

David J. Kappos
*Director of the United States Patent and Trademark Office*